United States Patent

Waite

[15] 3,645,069
[45] Feb. 29, 1972

[54] PACKING DEVICE FOR BAKED GOODS
[72] Inventor: Fred L. Waite, 66 Clinton Pl., Massapequa, N.Y. 11758
[22] Filed: July 9, 1970
[21] Appl. No.: 53,492

[52] U.S. Cl. .................................53/159, 53/247, 53/250
[51] Int. Cl. ..................................................B65b 35/32
[58] Field of Search ...........................53/159, 247, 249, 250

[56] References Cited

UNITED STATES PATENTS 3,495,377  2/1970  Delme..................................53/247 X
3,537,230  11/1970  Dorfmann............................53/159 X Primary Examiner—Travis S. McGehee
Attorney—J. Bradley Cohn

[57] ABSTRACT

A device for packing baked goods such as donuts in a box has cups into which baked goods are slid to be stacked two high, the cups being rotated to dump the baked goods on edge in a row on a retaining bar. The retaining bar is pivoted to be moved from below the baked goods to permit them to drop simultaneously into a box on edge in a longitudinal row.

10 Claims, 6 Drawing Figures

Patented Feb. 29, 1972

INVENTOR:
FRED L. WAITE

Patented Feb. 29, 1972
3,645,069
2 Sheets-Sheet 2
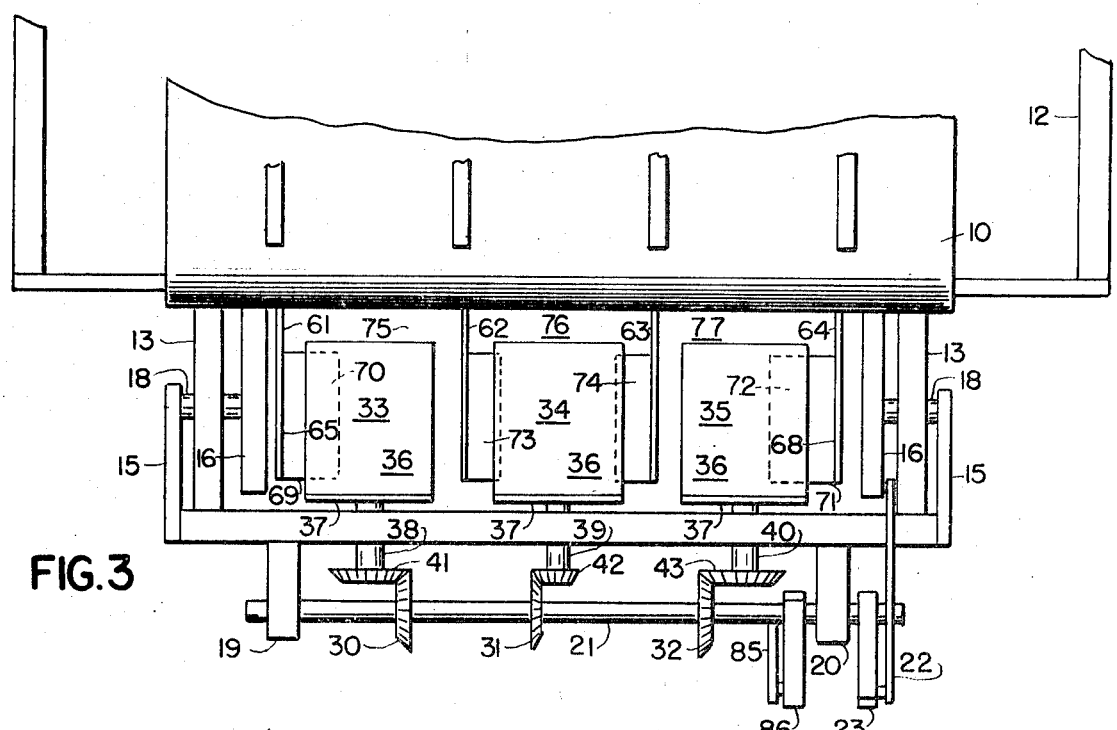
FIG.3
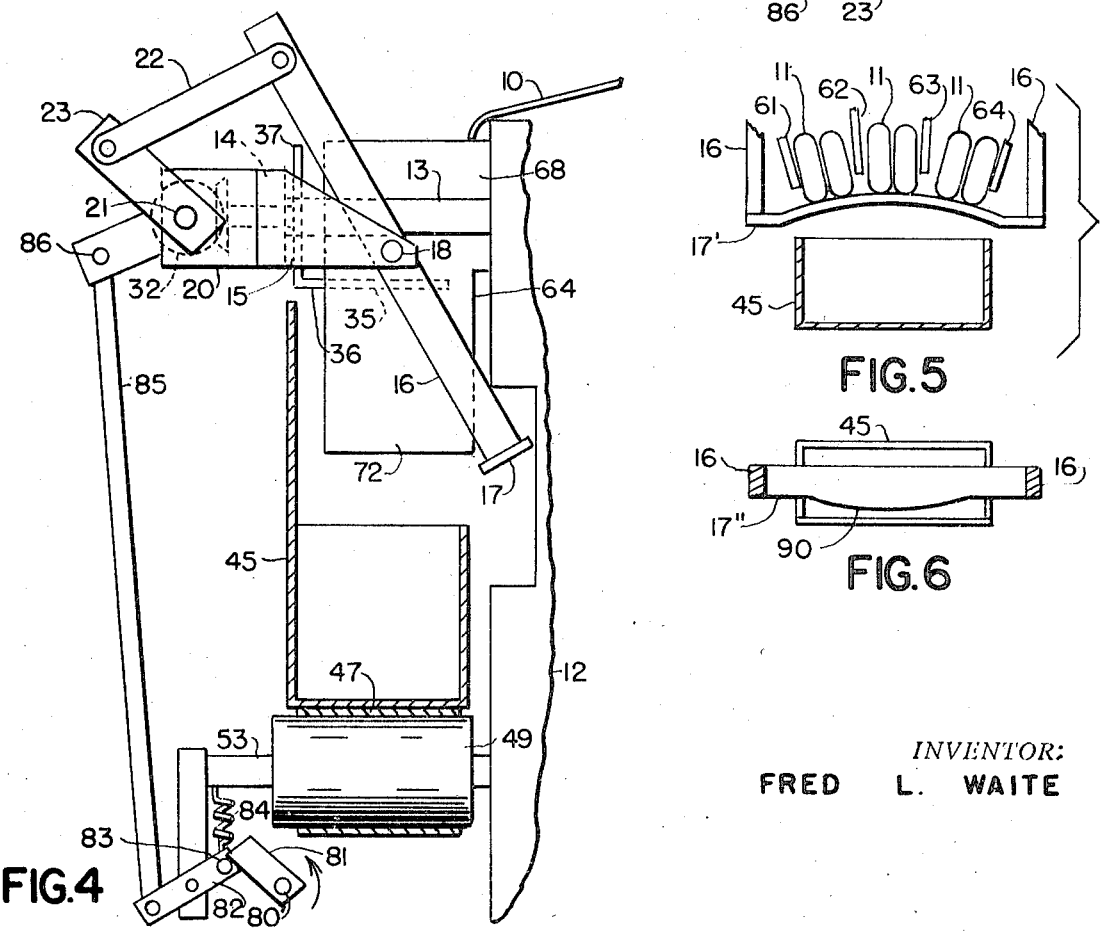
FIG.4
FIG.5
FIG.6
INVENTOR:
FRED L. WAITE

PACKING DEVICE FOR BAKED GOODS

BACKGROUND OF THE INVENTION

It is desirable to pack certain baked goods, such as donuts, on edge in a box in a longitudinal row. This invention enables donuts to be automatically packed in this manner.

BRIEF DESCRIPTION OF THE DRAWINGS

FIG. 3 is a top view of the device of this invention fixed to the front of a broken away unscrambling device and having the box conveyor removed;

FIG. 4 is a side view of the device of this invention with a box positioned thereunder on a conveyor, the box and the conveyor being shown in vertical section;

FIG. 5 is a front view of a first modification of a retaining bar with donuts thereon positioned over a box shown in vertical section; and FIG. 6 is a top view of a second modification of a retaining bar shown positioned over a box for baked goods.

DESCRIPTION OF THE PREFERRED EMBODIMENT

Figure 1:
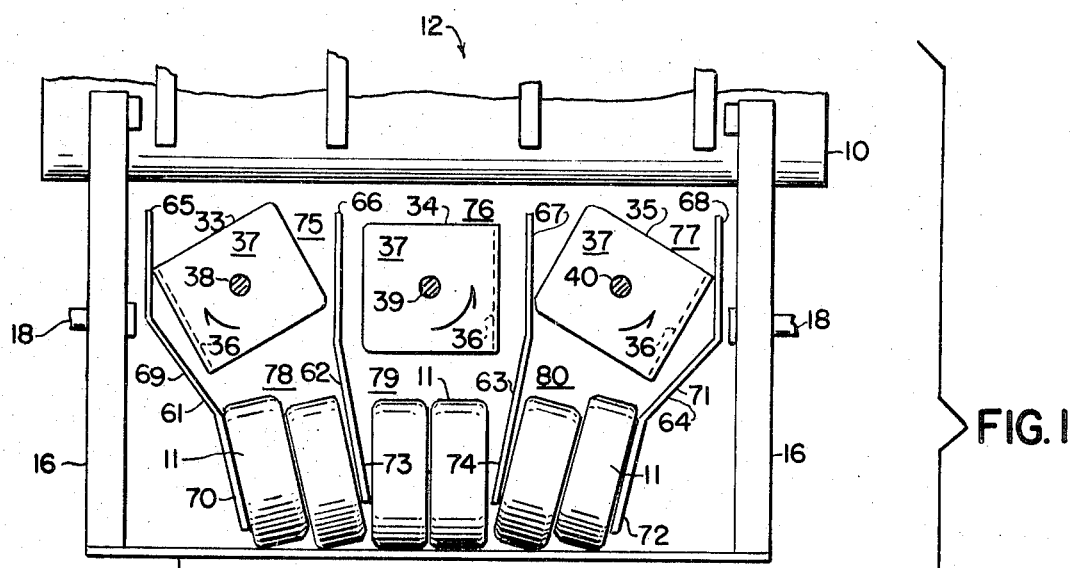
FIG. 1 is a front view, with frame, mounting, and actuating elements removed, of the device of this invention with boxes shown in vertical section on a conveyor prior to being packed.

As shown in FIGS. 1, 3 and 4, a delivery slide 10 has a pusher arm (not shown) which slides three donuts 11 or the like simultaneously forward off slide 10 during each cycle of an unscrambling device 12. Slide 10 is a part of the unscrambling device 12 which is shown and described in my patent applications filed herewith and entitled "Unscrambling Conveyor for Baked Goods" and "Packing Machine for Baked Goods."

Main support members 13 project forward from device 12 below the lip of slide 10. A transverse frame member 14 is fixed to the ends of the support members 13. Rearwardly extending plates 15 fixed over the ends of frame member 14 pivotally mount the arms 16 of a retaining bar 17 by means of the shafts 18.

Projections 19 and 20 have the main shaft 21 journaled in them. An arm 23 fixed on shaft 21 is connected by a link 22 to the upper end of one of the arms 16 of retaining bar 17. Bevel gears 30, 31 and 32 are also mounted on shaft 21. Cups 33, 34 and 35, each having a base 36 and a front plate 37 are rotatably mounted behind transverse frame member 14 by the cup mounting shafts 38, 39 and 40, respectively. The shafts 38, 39 and 40 are fixed to the front plates 37. Bevel gears 41, 42 and 43 are mounted on the shafts 38, 39 and 40 to mesh with the bevel gears 30, 31 and 32. There is a higher ratio between the bevel gears 31 and 42 than between the gears 30 and 41 or 32 and 43 so that rotation or oscillation of shaft 21 will rotate central cup 34 to a greater extent than cups 33 and 35.

Figure 2:
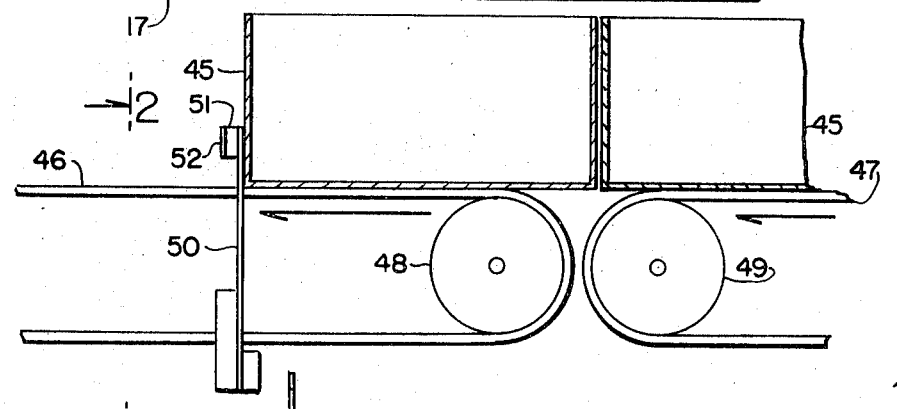
FIG. 2 is a section taken on line 2—2 of FIG. 1.
Figure 2:
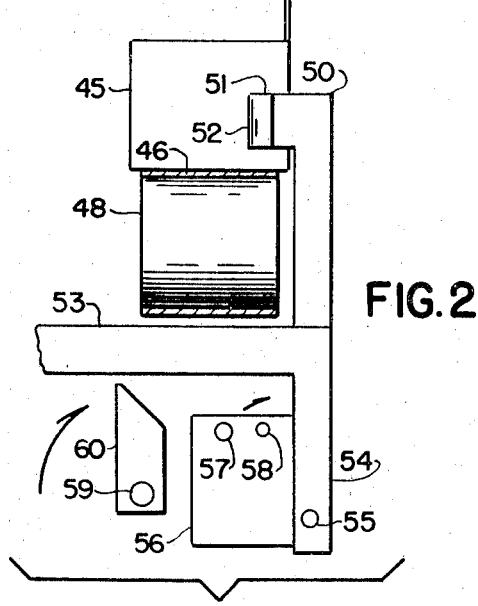

As shown in FIGS. 1 and 2, a line of boxes 24 are disposed on the conveyors 46 and 47 which have runs passing about the drums 48 and 49. Conveyor 46 is driven at a higher speed than conveyor 47. The first box 45 in the line of boxes rests on the moving conveyor 46 and is held in check by the stop 50. Stop 50 has a box contacting extension 51 with a rounded front end 52.

A bracket 53 is fixed to the unscrambling device 12 and has the stop 50 pivotally mounted on its lower extension 54 by means of a pin 55. A cam plate 56 extends forward from stop 50 and has two pins 57 and 58 projecting from it. A timing shaft 59 rotates once during each cycle required for the packing of a box 45. Shaft 59 carries cam 60 which strikes pin 57 to pivot stop 50 to the limit allowed by pin 58. This releases the first box 45. Since the first box 45 rests on the faster conveyor 46, it will move away from subsequent boxes 45 still on the slower conveyor 47 to leave a gap therebetween into which the box contacting extension 51 of stop 50 will fall to arrest the next box 45.

Referring again to FIGS. 1, 3 and 4, guides 61, 62, 63 and 64 have vertical upper portions 65, 66, 67 and 68 projecting from device 12. The outer guide 61 has lower portions 69 and 70 and the other outer guide 64 has lower portions 71 and 72 bent therefrom. The inner guides 62 and 63 have inward sloping lower portions 73 and 74. As may be seen in FIG. 1, the guides 61, 62, 63 and 64 provide upper areas 75, 76 and 77 to allow for the rotation of the cups 33, 34 and 35 therein. The guides 61, 62, 63 and 64 also provide lower converging channels 78, 79 and 80 each to receive a pair of upstanding baked goods therein.

As may be further seen in FIG. 4, the shaft 80', which also rotates once for each packing cycle of a box 45 as does shaft 59 of FIG. 2, has a cam 81 mounted thereon. Shafts 80' and 59 may be combined if desired and they may be driven with any conventional drive means from the unscrambling device 12 so that shafts 80' and 59 rotate once while device 12 cycles twice to deliver two baked goods 11 into each cup 33, 34 and 35.

A link 82 is pivotally mounted on frame 53 and has a pin 83 projecting from it to be engaged by the cam 81. Cam 81 intermittently rotates link 82 after which it is returned to the position shown by spring 84. A connecting rod 85 transmits the oscillation of link 82 to shaft 21 by means of the arm 86 fixed to shaft 21.

This invention operates in the following manner. The unscrambling device 12 makes two cycles, each cycle simultaneously sliding three baked goods 11 into the cups 33, 34 and 35. As the shafts 59 and 80' rotate once for each two cycles of the device 12, cam 81 oscillates shaft 21. The rotation of shaft 21 rotates the cups 33, 34 and 35 to the positions shown in FIG. 1 to drop the baked goods 11 on edge in pairs into the converging areas 78, 79 and 80. The wider upper areas 75, 76 and 77 allow the cups 33, 34 and 35 to rotate with slight clearances therein. The outer cups 33 and 35 rotate in opposite directions to spill baked goods 11 inwardly. These cups 33 and 35 may rotate less than 90° as the baked goods 11 therein slide from them at an angle. The central cup 34 should rotate 90° to spill the baked goods 11 therein directly downward. For this reason the ratios between the bevel gears 30 and 41 or 32 and 43 and the gears 31 and 42 are different.

As shaft 21 rotates, link 22 pivots an arm 16 of retaining bar 17 to move bar 17 under the guides 61–64 to arrest the downward sliding of the baked goods or donuts 11 in the channels 78, 79 and 80. The baked goods 11 then rest on the bar 17 as shown in FIG. 1.

When cam 81 clears pin 82, spring 84 returns the shaft 21 to the position shown in FIG. 4 to swing the retaining bar 17 from below the channels 78, 79 and 80. This simultaneously releases the aligned row of donuts 11 to drop them in box 45. As shaft 21 returns to the position shown in FIG. 4, the cups 33, 34 and 35 return to an upright position to receive additional baked goods 11 from slide 10. After it is packed, cam 60 releases the first packed box and the packing cycle is repeated.

Baked goods 11 often vary greatly in size. To ensure their entering a box 45, a modification shown in FIG. 5 is provided having an upwardly curving retaining bar 17'. This causes the baked goods 11 resting thereon to form an arch which is simultaneously dropped so that the outermost baked goods 11 enter box 45 first and the other baked goods 11 exert a wedging effect. The dropping arch of baked goods 11 ensures a tightly packed row in each box 45.

A further modification is shown in FIG. 6 in which a retaining bar 17" has a curved central forward projection 90. When the bar 17" is withdrawn from under baked goods 11, the outermost baked goods will drop sooner as the projection 90 continues to support central baked goods. This also provides a falling arch of baked goods 11 to better pack a box 45.

I claim:

1. A packing device for packing baked goods, such as donuts, into boxes in longitudinal rows on edge, said packing device being used in conjunction with an unscrambling device having a delivery slide from which baked goods are slid simultaneously during each cycle of the unscrambling device; said packing device comprising, in combination, cups disposed in front of said delivery slide, said cups having a base and a front plate, said cups being mounted to rotate in the plane of said front plate, said cups receiving baked goods from said delivery slide, guide means disposed about said cups forming converging channels below said cups, a movably mounted retaining bar disposed below the converging channels formed by said guide means, means positioning a box below said retaining bar, and means responsive to cycles of said unscrambling device rotating said cups to slide baked goods therein into said converging channels to rest on edge on said retaining bar, said means responsive to cycles of said unscrambling device subsequently withdrawing said retaining bar from below said converging channels and said baked goods dropping said baked goods on edge into a box.

2. The combination according to claim 1 with the addition of a frame member disposed in front of said delivery slide, cup mounting shafts fixed to the front plate of said cups and being journaled in said frame member, a main shaft disposed parallel to and in front of said frame member, and engaged pairs of bevel gears on said cup mounting shafts and said main shaft, said means responsive to cycles of said unscrambling device oscillating said main shaft to rotate said cups.

3. The combination according to claim 2, with the addition of pivotally mounted arms on each side of said guide means mounting said retaining bar, an arm on said main shaft, and a link extending from said arm on said main shaft to one of said pivotally mounted arms, said means responsive to cycles of said unscrambling device oscillating said shaft rotating said cups from an upright position and moving said retaining bar below said converging channels and then counter rotating said cups to an upright position and withdrawing said retaining bar from below said converging channels.

4. The combination according to claim 3 wherein said means responsive to cycles of said unscrambling device oscillates said main shaft once during two cycles of said unscrambling device sliding pairs of stacked baked goods from said cups on edge into said converging channels.

5. The combination according to claim 4 wherein the outermost of said cups are rotated in opposite directions by said pairs of bevel gears, the bases of said cups moving outward sliding baked goods inward into the converging channels.

6. The combination according to claim 5 wherein there are three of said cups, two outer cups and a central cup, the outer cups being rotated by said pairs of bevel gears less than 90° to slide baked goods inward and the central cup being rotated substantially 90° to slide baked goods directly downward.

7. The combination according to claim 4 wherein said means responsive to cycles of said unscrambling device is a timing shaft rotating once for each two cycles of said unscrambling device, and with the addition of a second arm mounted on said main shaft, a connecting rod connected to said second arm, a cam mounted on said timing shaft, and spring returned means connected to said connecting rod and engaged by said cam once each revolution of said cam oscillating said main shaft.

8. The combination according to claim 7 wherein said means positioning a box below said retaining bar comprises a moving conveyor passing below said converging channels, said conveyor having a first fast moving belt supporting a first box and a second slow moving belt supporting additional boxes, a pivotally mounted box stop extending over said first belt arresting the first of a line of boxes, a second cam rotating once for each two cycles of said unscrambling device to engage and pivot said box stop releasing the first of said boxes after packing, said fast belt moving the first packed box faster than the next box allowing said box stop to pivot and arrest the next box for packing.

9. The combination according to claim 4 wherein said retaining bar is curved upwards dropping baked goods in an arch into a box with the outermost baked goods entering the box first.

10. The combination according to claim 4 wherein said retaining bar has a curved central forward projection releasing central baked goods thereon after outermost baked goods to drop the baked goods in an arch into a box with the outermost baked goods entering the box first.

* * * * *